United States Patent
Bleacher et al.

(10) Patent No.: US 9,529,431 B2
(45) Date of Patent: *Dec. 27, 2016

(54) DIRECTIONAL SOUND SYSTEMS INCLUDING EYE TRACKING CAPABILITIES AND RELATED METHODS

(71) Applicant: Thales Avionics, Inc., Irvine, CA (US)

(72) Inventors: Brett Bleacher, Rancho Santa Margarita, CA (US); Christopher K. Mondragon, Laguna Niguel, CA (US)

(73) Assignee: Thales Avionics, Inc., Irvine, CA (US)

( * ) Notice: Subject to any disclaimer, the term of this patent is extended or adjusted under 35 U.S.C. 154(b) by 135 days.

This patent is subject to a terminal disclaimer.

(21) Appl. No.: 14/530,888

(22) Filed: Nov. 3, 2014

(65) Prior Publication Data

US 2015/0049887 A1  Feb. 19, 2015

Related U.S. Application Data

(63) Continuation-in-part of application No. 13/605,485, filed on Sep. 6, 2012, now Pat. No. 8,879,760.

(51) Int. Cl.
*H04R 5/02* (2006.01)
*G06F 3/01* (2006.01)
(Continued)

(52) U.S. Cl.
CPC .......... *G06F 3/013* (2013.01); *G06K 9/00832* (2013.01); *H04R 3/12* (2013.01); *H04S 7/302* (2013.01);
(Continued)

(58) Field of Classification Search
CPC ..... H04R 3/12; H04R 27/00; H04R 2201/401; H04R 2203/12; H04R 2499/13; H04R 2499/15; H04S 7/302; H04S 2400/11; G06K 9/00832; G06F 3/013
(Continued)

(56) References Cited

U.S. PATENT DOCUMENTS

2004/0209654 A1  10/2004 Cheung et al.
2008/0273723 A1* 11/2008 Hartung ................. H04R 1/403
                                                    381/302
(Continued)

FOREIGN PATENT DOCUMENTS

DE    199 38 171 A1    3/2001
DE    19938171 A1 *    3/2001   ......... G10K 11/1788

OTHER PUBLICATIONS

Notification Concerning Transmitting of International Preliminary Report on Patentability, PCT/US2013/055932, Mar. 10, 2015, 7 pages.
(Continued)

*Primary Examiner* — Paul S Kim
(74) *Attorney, Agent, or Firm* — Myers Bigel, P.A.

(57) ABSTRACT

Entertainment systems are provided including directional sound speakers embedded in a headrest of a passenger seat, the headrest being associated with a media player of the entertainment system; and a directional sound controller associated with the directional sound speakers of the media player. The directional sound controller is configured to direct a sound beam associated with the media player at a defined target region such that the sound beam is only audible within the defined target region and experiences less than about 20 dB of leakage outside the target region during operation of the media player. In-flight entertainment systems and related methods are also provided.

37 Claims, 13 Drawing Sheets

(51) Int. Cl.
*G06K 9/00* (2006.01)
*H04R 3/12* (2006.01)
*H04S 7/00* (2006.01)
*H04R 27/00* (2006.01)

(52) U.S. Cl.
CPC ......... *H04R 27/00* (2013.01); *H04R 2201/401* (2013.01); *H04R 2203/12* (2013.01); *H04R 2499/13* (2013.01); *H04R 2499/15* (2013.01); *H04S 2400/11* (2013.01)

(58) Field of Classification Search
USPC ........................................ 381/302, 182, 303
See application file for complete search history.

(56) References Cited

U.S. PATENT DOCUMENTS

2010/0150361 A1    6/2010   Kim
2010/0284544 A1   11/2010   Kim

OTHER PUBLICATIONS

Betlehem et al., "A constrained optimization approach for multi-zone surround sound," 2011 IEEE International Conference on Acoustics, Speech and Signal Processing, May 22, 2011, pp. 437-440.
Shin et al., "Maximization of acoustic energy difference between two spaces," The Journal of the Acoustical Society of America, American Instititue of Physics for the Acoustical Society of America, vol. 128, No. 1, Jul. 1, 2010.
Notification of Transmittal of the International Search Report and the Written Opinion of the International Searching Authority, or the Declaration, PCT/US2013/055932, Nov. 14, 2013, 10 pages.

\* cited by examiner

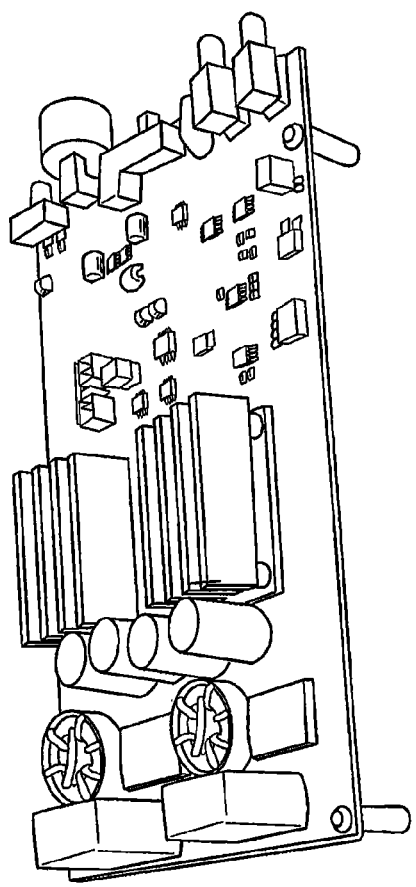
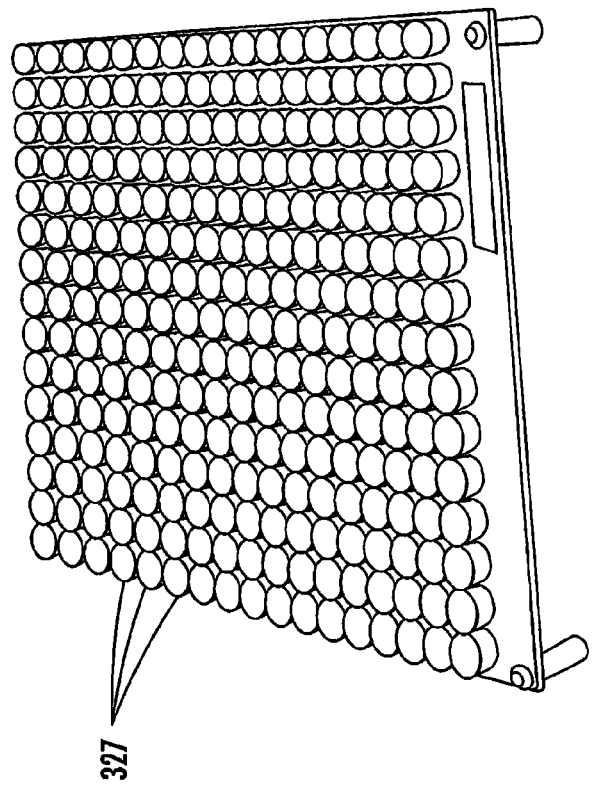
FIGURE 3B
FIGURE 3A
327

DIRECTIONAL SOUND SYSTEMS INCLUDING EYE TRACKING CAPABILITIES AND RELATED METHODS

CLAIM OF PRIORITY

The present application is a continuation in part of U.S. patent application Ser. No. 13/605,485, filed on Sep. 6, 2012 (now U.S. Pat. No. 8,879,760), the disclosure of which is hereby incorporated herein by reference as if set forth in its entirety.

FIELD

Embodiments described herein relate generally to electronic entertainment systems and, more particularly, to sound systems for use in entertainment systems.

BACKGROUND

The approaches described in this section could be pursued, but are not necessarily approaches that have been previously conceived or pursued. Therefore, unless otherwise indicated herein, these approaches are not known to be prior art and are not admitted to be prior art by inclusion in this section.

Directional sound is a technology that concentrates acoustic energy into a narrow beam so that it can be projected to a discrete area, similar to how a spotlight focuses light on a particular area of interest. When sound waves are focused in this manner, these sound waves behave in a manner somewhat resembling the coherence of light waves in a laser. When a sound beam is aimed at a listener, that person senses the sound as if it is coming from, for example, a headset or earphones. When the listener steps outside of the sound beam or when the sound beam is redirected, the sound disappears.

Directional sound has many advantages over conventional headsets or earphones, which are typically required to listen to audio. Headphones and/or earphones can be uncomfortable when used over a long period of time. When headphones/earphones are intended for use in a public setting, hygiene problems can arise in that these accessories may become unsanitary or unattractive to listeners. Moreover, headphones/earphones are subject to wear, which can diminish their useful life and increase maintenance costs. Furthermore, there is the potential for abuse and damage from vandalism to these accessories.

SUMMARY

Some embodiments of the present inventive concept provide entertainment systems including directional sound speakers associated with a media player of the entertainment system; and a directional sound controller associated with the directional sound speakers of the media player. The directional sound controller is configured to direct a sound beam associated with the media player at a defined target region such that the sound beam is only audible within the defined target region and experiences less than about 20 dB of leakage outside the target region during operation of the media player.

In further embodiments, the target region may experience no greater than about 5.0 dB of leakage during operation of the media player.

In still further embodiments of the present inventive concept, the directional sound controller may include a beam forming and audio wave shaping module configured to direct the sound beam such that the sound beam extends to a preset distance from the directional sound speakers.

In some embodiments, the preset distance may be from about 2.5 inches to about 10 feet from the directional sound speakers. In certain embodiments, the sound beam may extend no greater than about 2.5 inches from the directional sound speakers.

In further embodiments, the entertainment system may further include transducers and/or a sound dome. The beam forming and audio wave shaping module may be configured to direct the sound beam such that the sound beam extends to a preset distance from the directional sound speakers, the transducer and/or the sound dome.

In still further embodiments, the beam forming and audio wave shaping module may be further configured to direct the sound beam in a horizontal direction from the directional sound speakers and toward the target region.

In some embodiments, the system may further include a seat within the target region, wherein the media player and directional sound speakers are integrated in a back or side portions of the seat or headrest. A hood configured to be positioned over the target region may also be provided to create a cone of sound for the target region. In certain embodiments, a hood may be a plexiglass hood. Each of the directional sound speakers may include a cluster of smaller speakers and/or transducers.

In further embodiments, the system may further include a media player and directional sound speakers integrated in a back or side portions of the seat or headrest, wherein the seat comprises sound absorbing materials.

In still further embodiments, the directional sound controller may further include a noise cancelling/reduction module that is configured to reduce and/or neutralize sound leakage outside the target region.

In further embodiments, the entertainment system may generate white or comfort noise to mask out any unwanted sounds generated outside of the target region that cannot be neutralized by the noise cancelling/reduction module.

In some embodiments, each of the directional sound speakers may be configured to include a plurality of audio transducers. The plurality of audio transducers may be from about 10 to about 200 audio transducers.

In further embodiments, the entertainment system may be an in-flight entertainment (IFE) system on an aircraft. The IFE system may be designed to comply with all relevant government and airlines standards.

In still further embodiments, the media player may be a smart video display unit associated with the IFE system, the smart video display unit being integrated into a seatback on the aircraft. The target region may be one of a seat on the aircraft, a group of seats on the aircraft and a specific location in a common area on the aircraft. The target region may be a seat in one of first class, business class and coach class. The target region may be a single user or group of users.

In some further embodiments, the entertainment system may be integrated with a vehicle. The vehicle may be one of a train, a bus, a cruise ship and a military aircraft.

Further embodiments provide IFE systems for use on an aircraft, the IFE system including a media player integrated into the aircraft; directional sound speakers associated with the media player of the IFE system; and a directional sound controller associated with the directional sound speakers of the media player. The directional sound controller is configured to direct a sound beam associated with the media player at a defined target region of the aircraft such that the sound beam is only audible within the defined target region of the aircraft and experiences less than about 20 dB of leakage outside the target region during operation of the media player.

In still further embodiments, the media player may be integrated into a seat back of the aircraft; the target region may include a passenger seated in a seat of the aircraft; and the directional sound controller is configured to direct a sound beam associated with the media player at the passenger seated in the seat of the aircraft such that the sound beam is only audible by the passenger seated in the seat.

Some embodiments provide methods of directing sound of a media player on an aircraft, the method including directing a sound beam associated with a media player integrated in an in-flight entertainment (IFE) system of the aircraft at a defined target region of the aircraft such that a sound beam created by directional sound speakers associated with the media player of the IFE system is only audible within the defined target region of the aircraft and experiences less than about 20 dB of leakage outside the target region during operation of the media player.

Further embodiments of the present inventive concept provide an entertainment system including directional sound speakers embedded in a headrest of a passenger seat and associated with a media player of the entertainment system; and a directional sound controller associated with the directional sound speakers of the media player. The directional sound controller is configured to direct a sound beam associated with the media player at a defined target region such that the sound beam is only audible within the defined target region and experiences less than about 20 dB of leakage outside the target region during operation of the media player.

In still further embodiments, the headrest including the directional sound speakers may be configured to adjust a position thereof based on a passenger seated in the passenger seat.

In some embodiments, the headrest including the directional sound speakers may include three portions, a center portion and two wing portions. Each of the center portion and two wing portions may be configured to move separately. The headrest may be configured to move at least one of up and down; side to side; and forward and backward to adjust to the position of the passenger seated in the passenger seat.

In further embodiments, the two wing portions may be configured to move between a first position, remote from ears of the passenger, to a second position, closer to ears of the passenger. The two wings may be configured to adjust to a plurality of positions between the first position and the second position.

In still further embodiments, the headrest including the directional sound speakers may be configured to adjust responsive to one of voice input of the passenger; manual input of the passenger and eye tracking input from the passenger's eyes.

In some embodiments, the system may further include an eye tracking system including at least one eye tracking camera and associated sensors. The eye tracking system may be configured to obtain a location of a passenger's eyes such that positions of the passenger's ears are determined via facial recognition. The headrest may be adjusted responsive to the determination of the position of the passenger's ears.

In further embodiments, the system may be further configured to fine tune the position of the headrest using one of audio input, manual input or a combination thereof.

In still further embodiments, the system may obtain the location of the passenger's ears by locating the direction and location of a voice via microphone triangulation and then calculate the ear locations based on the location of the mouth via the voice source location.

In some embodiments, the system may obtain with location of the passenger's head and therefore ear locations via head and body pressure sensors location within the passenger's seat.

In further embodiments, the entertainment system may be an in-flight entertainment (IFE) system on an aircraft. The IFE system may be designed to comply with all relevant government and airlines standards.

In still further embodiments, the entertainment system may be integrated with a vehicle. The vehicle may be a train, a bus, a cruise ship and/or a military aircraft.

Some embodiments of the present inventive concept provide methods of providing directional system including positioning at least two directional sound speakers in a headrest of a passenger seat in a passenger vehicle; and adjusting the headrest including at least two directional sound speakers to accommodate a passenger seated in the passenger seat such that a defined target region in which a sound beam is audible is customized for the passenger seated in the passenger seat.

BRIEF DESCRIPTION OF THE DRAWINGS

The accompanying drawings, which are included to provide a further understanding of the disclosure and are incorporated in and constitute a part of this application, illustrate certain non-limiting embodiments of the inventive concept. In the drawings:

FIGS. 3A and 3B are diagrams of components that may be included in the directional sound speakers of FIGS. 1-2B in accordance with some embodiments of the present inventive concept.

DETAILED DESCRIPTION

Figure 1:
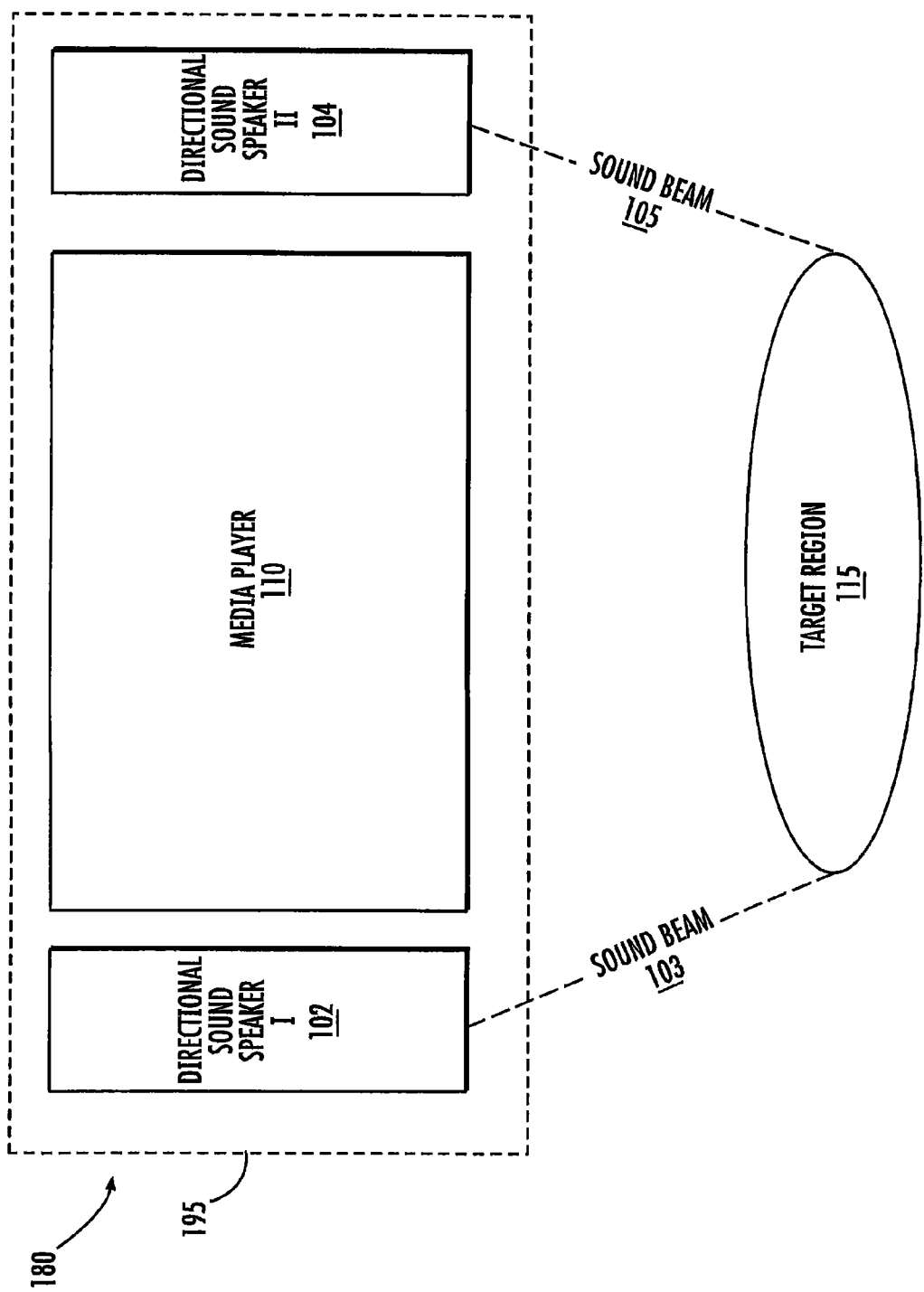
FIG. 1 illustrates a directional sound system including a media device and directional sound speakers in accordance with some embodiments of the present inventive concept.

The following detailed description discloses various non-limiting example embodiments of the inventive concept. The inventive concept can be embodied in many different forms and is not to be construed as limited to the embodiments set forth herein.

Although various embodiments of the present inventive concept will be discussed herein with respect in-flight entertainment (IFE) systems integrated in a seat of an aircraft, embodiments of the present inventive concept are not limited to this configuration. For example, embodiments of the present inventive concept may be used in any environment that would benefit from the details thereof. For example, embodiments of the present inventive concept may be used in entertainment systems on trains, buses, or cruise ships as well as in military aircrafts for training, briefing and debriefing without departing from the scope of the present inventive concept.

As discussed above, headsets or earphones are typically used to listen to audio, for example, audio provided by an IFE on the aircraft. Use of accessories, such as headphones and earphones, can have disadvantages, for example, these accessories may be uncomfortable when used over a long period of time. Furthermore, when used in a public environment, these accessories may have to be cleaned and maintained by the airlines and handed out and collected by the flight attendants, which can be time consuming. Furthermore, audio jacks connected to the headphones/earphones can break easily due to over use or abuse, which causes an added expense of replacing the headphones/earphones. Some airlines provide headphones/earphones free of charge or for minimal cost, however, the quality of these headphones/earphones is typically very poor.

Accordingly, some embodiments of the present inventive concept provide directional sound systems that enable listeners to hear audio presented on a media device without the use of headphones/earphones or similar accessory. As will be discussed herein with respect to FIGS. 1 through 9, in some embodiments, directional sound technology can be embedded within an aircraft seat configuration whereby the passenger can hear good quality audio sound from the media device without the use of accessories. Embodiments of the present inventive concept may be used in combination with premium, first class, business class and/or coach class seating without departing from the scope of the present inventive concept. In further embodiments, directional sound technology may also be implemented in social or bar areas of the aircraft without departing from the scope of the present inventive concept.

Some conventional headsets/earphones or the IFE system itself are connected to include noise cancellation/reduction circuitry to mask aircraft and passenger noise. These noise cancellation/reduction circuits can be built into the IFE hardware or the headphone jack located in, for example, the seatback or seat arm. Directional sounds systems in accordance with embodiments discussed herein may eliminate the need to use utilize headphones or earphones as will be discussed herein.

Referring first to FIG. 1, a directional sound system 180 in accordance with some embodiments of the present inventive concept will now be discussed. As illustrated in FIG. 1, the directional sound system 180 includes a media player 110 and associated first and second directional sound speakers 102 and 104. It will be understood that although directional sound speakers 102 and 104 are illustrated as single speakers, these speakers may be made up of clusters of smaller speakers and/or transducers without departing from the scope of the present inventive concept. Similarly, although only two directional sound speakers 102 and 104 are illustrated in FIG. 1, one or more than two directional sound speakers may be present in the system 180 without departing from the scope of the present inventive concept. Finally, although the media player 110 and the directional sound speakers 102/104 are illustrated as separate components, these components can be combined into one integrated device as illustrated by the dotted line 195.

Figure 2A:
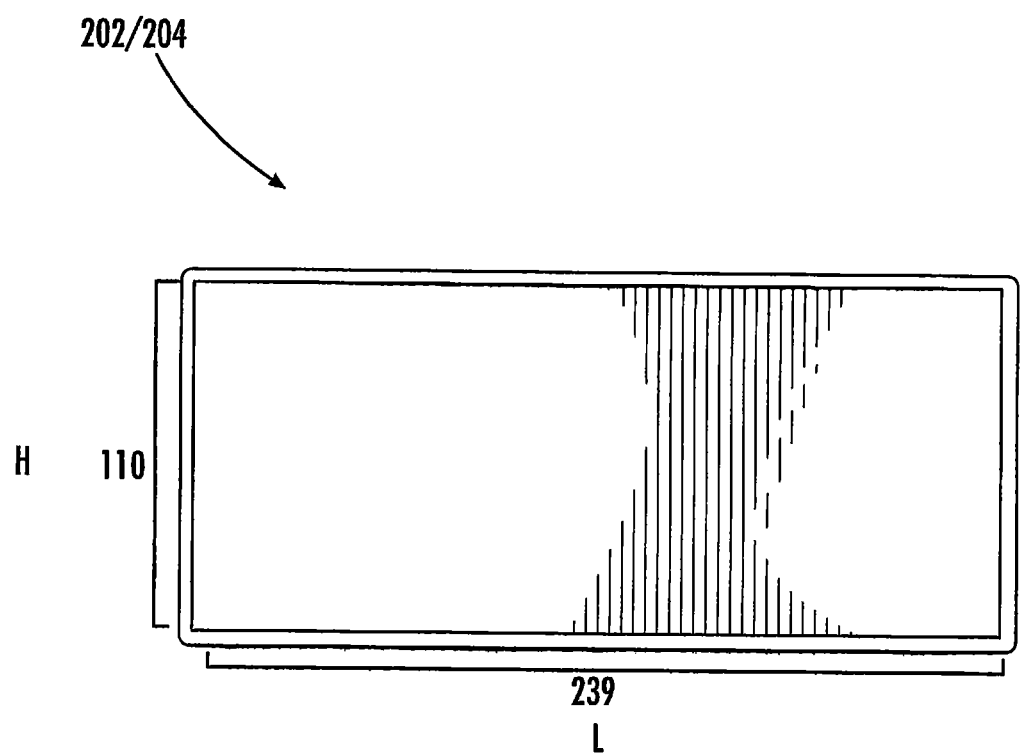
FIGS. 2A and 2B are diagrams illustrating example directional sound speakers in accordance with some embodiments of the present inventive concept.
Figure 2B:
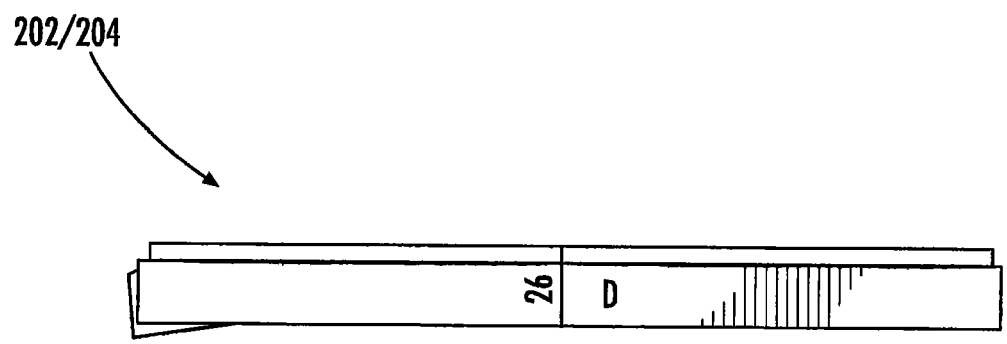

Example embodiments of directional sound speakers 102 and 104 are illustrated in FIGS. 2A through 3B. FIGS. 2A and 2B are diagrams illustrating a front view and side view of a directional sound speaker 202/204, respectively, in accordance with some embodiments of the present inventive concept. The directional sound speakers 202/204 illustrated in FIGS. 2A and 2B have a length L of about 9.45 inches (24 cm), a height H of about 4.33 inches (11 cm) and a depth D of about 1.06 inches (2.7 cm). The directional sound speaker 202/204 illustrated in FIGS. 2A and 2B may include a plurality of audio transducers 327, for example, 10 to 200 audio transducers as illustrated in FIG. 3A. Each of these speakers 202/204 may include both a right and left channel to produce stereo audio. 5:1 Surround Sound may also be generated from only 2 or more speakers. FIG. 3B illustrates a speaker controller board in accordance with some embodiments. The directional sound controller will be discussed further below.

Referring again to FIG. 1, the directional sound system is configured to direct a sound beam 103/105 associated with the media player 110 at a defined target region 115, such that the sound beam 103/105 is only audible within the defined target region 115. As used herein, a "sound beam" refers to the output of the directional sound system 180 according to some embodiments of the present inventive concept. Thus, the sound beam 103/105 is the product of the sound waves being focused into a beam 103/105 directed at the target region. The target region could be, for example, a person or group of persons. In particular embodiments, the target region could be a person in a seat of an aircraft as will be discussed further below. Directional sound systems 180 in accordance with embodiments of the present inventive concept experience less than about 20 dB of leakage outside the target region 115 during operation of the media player. In particular, embodiments the target region 115 experiences no greater than about 5.0 dB of leakage during operation of the media player.

In an aircraft environment, while in flight, the aircraft exhibits approximately 70 to 85 dB of noise. Thus, the 20 dB or less of noise leakage experienced by embodiments of the present inventive concept would typically not be audible to the passengers outside the target region 115 during the flight. However, the aircraft noise significantly decreases when the aircraft is on the ground; thus, the least amount of leakage outside the target region is desirable.

Figure 4:
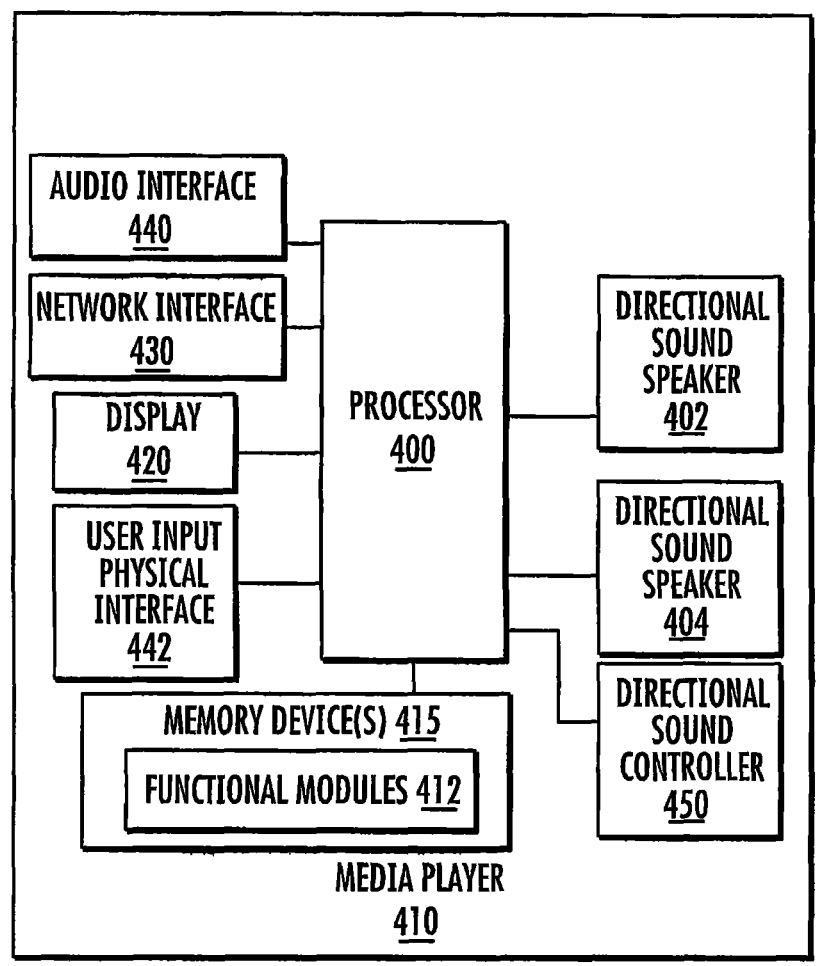
FIG. 4 is a block diagram illustrating components of a media player in accordance with some embodiments of the present inventive concept.

Referring again to FIG. 1, the media player 110 may be, for example, a smart video display unit (SVDU) of an IFE system. Details of the media player 110 will now be discussed with respect to the block diagram of FIG. 4 illustrating example components that may be included in a media player, such as the SVDU according to some embodiments. Referring to FIG. 4, the media player 410 includes a processor 400, memory device(s) 415 that contain functional modules 412, the directional sound speakers 402 and 404, a display device 420 (e.g., a liquid crystal display which may include a touch-sensitive interface), an audio interface 440, and/or a wired or wireless network interface 430. The media device 410 may further include a physical interface 442 (e.g., switches, control wheels, buttons, keypad, keyboard, etc.) that can be manipulated by a passenger to control the media device 410 and other defined components/systems within the aircraft.

The processor 400 includes one or more data processing circuits, such as a general purpose and/or special purpose processor (e.g., microprocessor, FPGA (Field Programmable Array) and/or DSP (digital signal processor)). The processor 400 is configured to execute computer program instructions from the functional modules 412 in the memory device(s) 410, described below as a computer readable medium, to perform some or all of the operations and methods that are described herein for one or more of the embodiments.

The processor 400 may receive music, video, games, data, and application programs through the network interface 430, which it processes for display on the display device 420 and/or for output as audio through the audio interface 440 to, for example, directional sound speakers 402/404 using the directional sound controller 450 in accordance with embodiments of the present inventive concept.

It will be understood that although the directional sound speakers 402 and 404 are depicted in FIG. 4 as being part of the media player 410, these components may be separate without departing from the scope of the present inventive concept.

Figure 5:
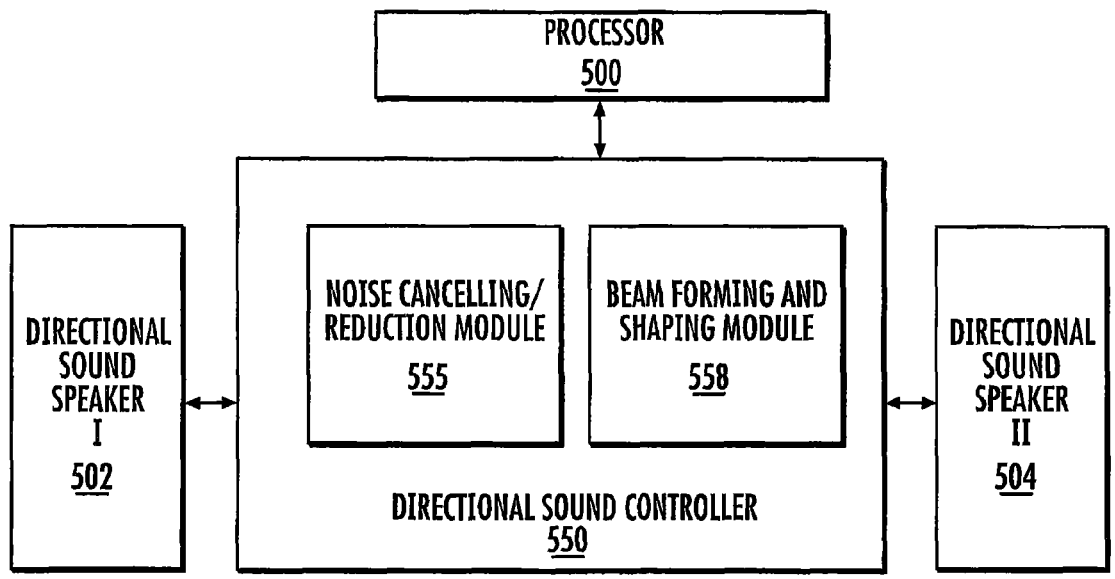
FIG. 5 is a block diagram of a directional sound system in accordance with some embodiments of the present inventive concept.

Referring now to FIG. 5, details of the directional sound controller 450 in accordance with some embodiments of the present inventive concept will be discussed. As illustrated in FIG. 5, the directional sound controller 550 is coupled to the directional sound speakers 502 and 504 and the processor 500 discussed above with respect to FIG. 4. The directional sound controller 550 includes a beam forming and audio beam forming and wave shaping module 558 and a noise cancelling/reduction module 555.

The directional sound controller 550 is configured to direct a sound beam associated with the media player at a defined target region such that the sound beam is only audible within the defined target region and experiences less than about 20 dB of leakage outside the target region during operation of the media player.

In particular embodiments, the beam forming and audio wave shaping module 558 may be configured to direct the sound beam in a horizontal direction from the directional sound speakers 502/504 and toward the target region. The noise cancelling/reduction module 555 is configured to reduce sound leakage outside the target region. As discussed above, in some embodiments the leakage outside the target region may be no greater than about 5.0 dB.

It will also be understood that in some embodiments, the noise cancelling/reduction module 555 may be configured to produce substantial or possibly total silence within the target region without departing from the scope of the present inventive concept.

As discussed above, some embodiments of the directional sound system discussed herein can be used in combination with an IFE system of an aircraft. However, embodiments of the present inventive concept are not limited to this configuration. For example, embodiments of the present inventive concept may be used in other vehicles, such as a car, a train, a bus, a cruise ship and a military aircraft without departing from the scope of the present inventive concept.

Figure 6:
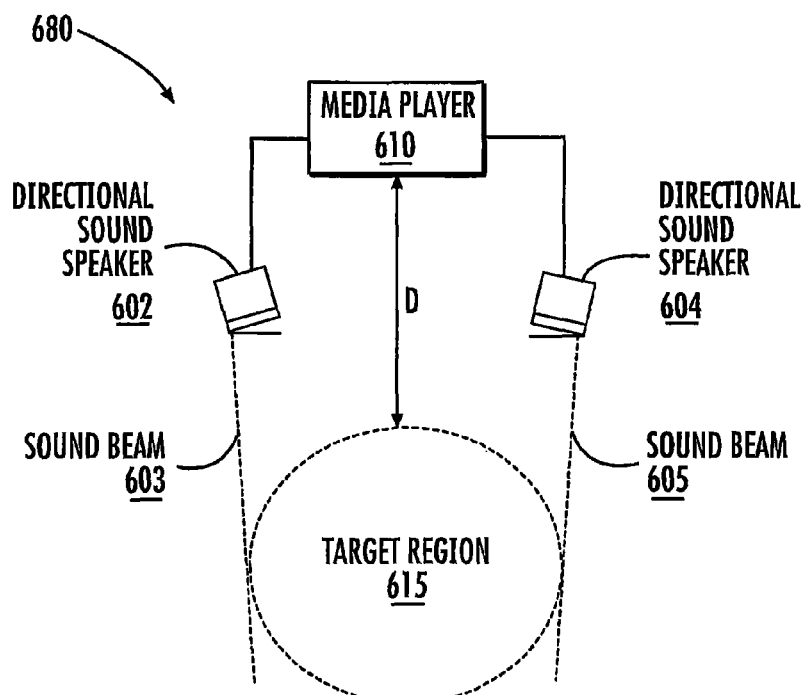
FIG. 6 is a block diagram of a directional sound system defining a target region according to some embodiments of the present inventive concept.

Referring now to FIGS. 6 through 9, embodiments of the present inventive concept integrated in an IFE system of an aircraft will be discussed. The aircraft environment presents a unique issue for directional sound applications due to the close proximity of passengers. Referring to FIG. 6, a block diagram of a directional sound system 680 in accordance with some embodiments will be discussed. As illustrated therein, the distance between the media player 610 and the target region 615, or in this case, the passenger seated in the seat of the aircraft, is very small. For example, for a business class seat the distance D may be from about 3.0 to about 6.0 feet. In a coach class seat, this distance D may only be about 1.5 to 2.5 feet. Thus, in a coach class seat, a reduction in size of the directional sound speakers and a modified controller to shorten the range (less than 1.5 feet) may be needed. Thus, the beam forming and audio wave shaping module 558 may be configured to direct the sound beams 603 and 605 such that the sound beam only extends from about 1.5 to about 6.0 feet from the directional sound speakers 602/604 or media player 610 to the target region 615.

It will be understood that the beam forming an audio shaping module 558 is configured to direct the sound beam such that the sound beam extends to a preset distance. In some embodiments, this preset distance is from about 1.5 to about 10 feet, however, embodiments of the present inventive concept is not limited to these distances.

Figure 7:
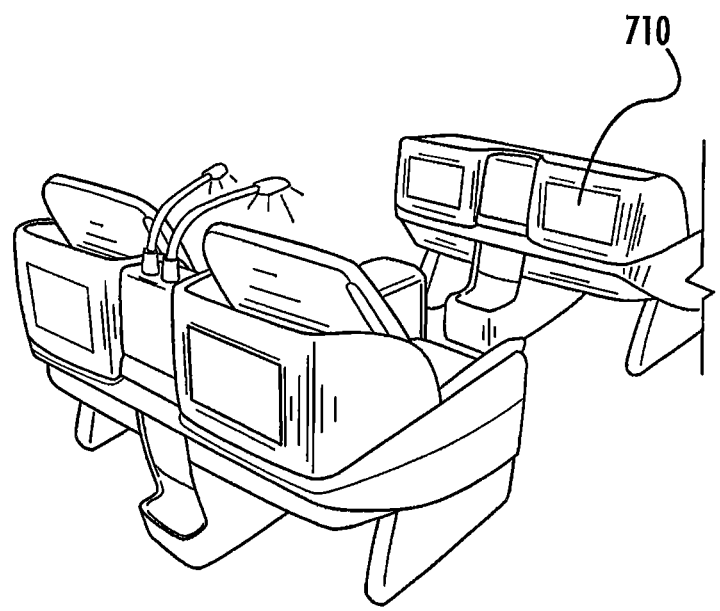
FIG. 7 is a block diagram illustrating a seat configuration including a directional sound system in accordance with some embodiments of the present inventive concept.
Figure 8:
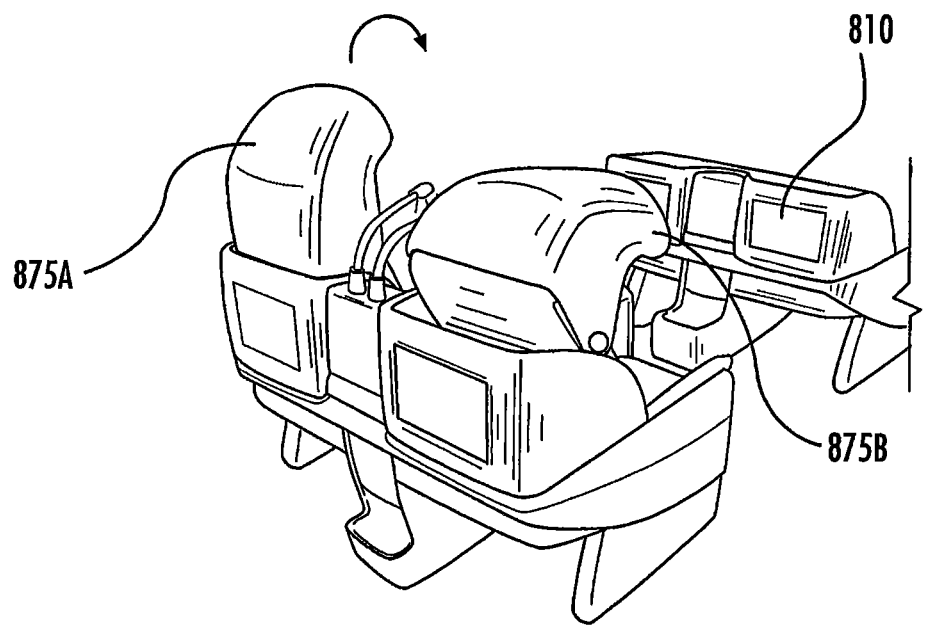
FIG. 8 is a block diagram illustrating an alternative seat including a directional sound system in accordance with some embodiments of the present inventive concept.

As illustrated in FIGS. 7 and 8, in some embodiments the media player and the directional sound speakers are integrated in a seatback of a seat on an aircraft 710/810. In some embodiments, the seats may be made of sound absorbing materials. As illustrated in FIG. 8, in some embodiments, the system includes a hood 875A/B (sound dome) that can be moved from a first position 875A to a second position 875B to create a cone of sound for the passenger seated in the seat. In some embodiments, this hood may be made of Plexiglas.

Figure 9:
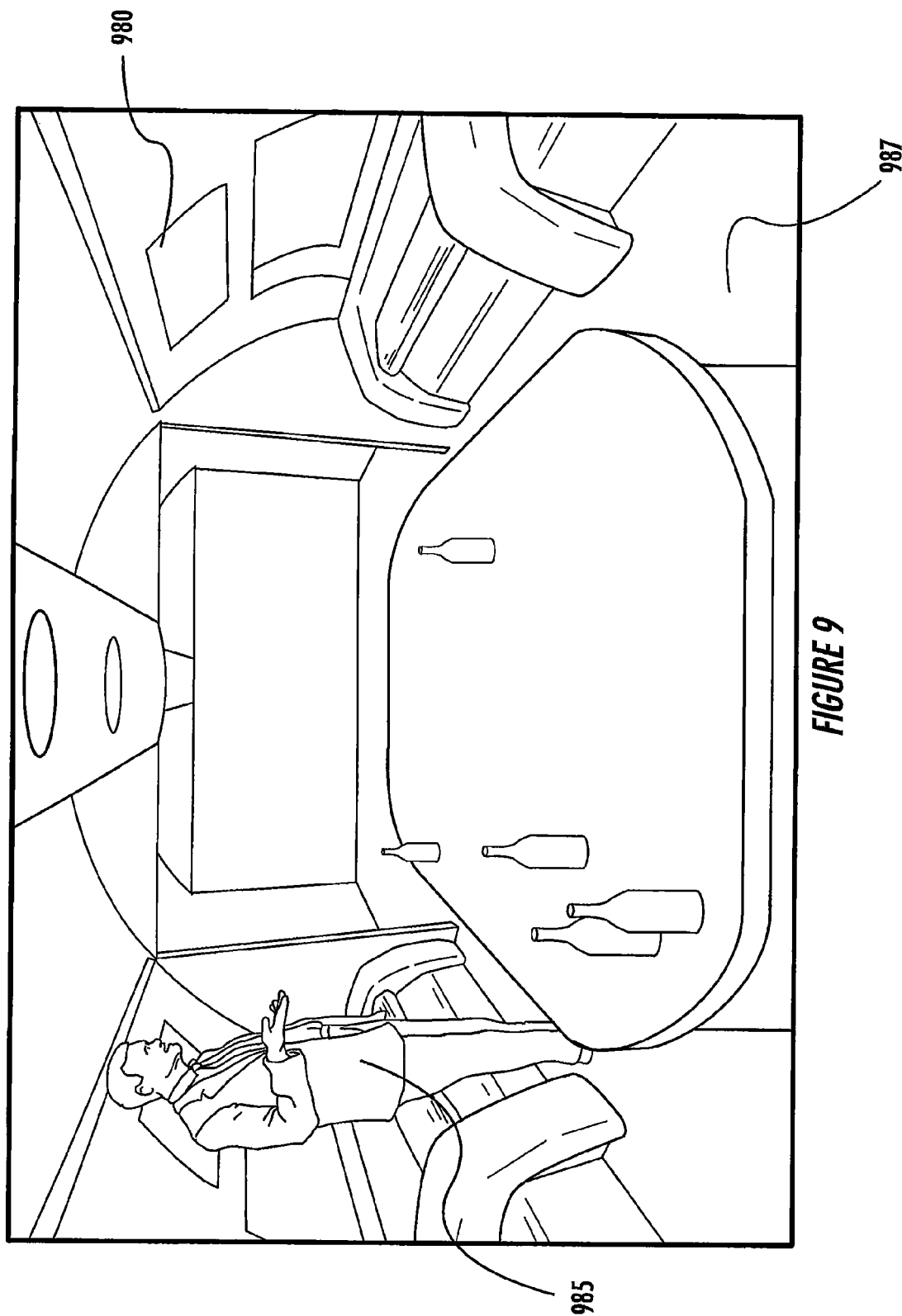
FIG. 9 is a block diagram illustrating a common area including a directional sound system in accordance with some embodiments of the present inventive concept.

Referring now to FIG. 9, the directional sound system in accordance with some embodiments may be used in a common area of the aircraft. For example, passengers in the target region of video display 980 may be able to hear the audio associated with the video display 980, but the passengers standing or seated at other locations 985 and 987 will not.

As discussed herein, some embodiments of the present inventive concept use directional sound technology to direct and beam form audio sound waves directly to a single individual passenger, multiple passengers or a target region without others outside the target region hearing the audio or being bothered by the audio. Thus, embodiments of the present inventive concept remove the need for uncomfortable headphones or earphones used by the passenger and, thus, reduce the workload on the flight attendants who no longer have to pass out the headphones/earphones. Furthermore, the headphones/earphones do not have to be cleaned and there is no longer a worry about abuse or theft of these devices.

As discussed above, in some embodiments directional sound systems use speakers including a plurality of audio transducers, a directional sound controller unit and related algorithms to beam form and shape the sound to directly to one single passenger eliminating sound leakage or reflections to other adjacent passengers. In some embodiments, the directional sound technology may also be applied and directed to a group of passenger divided by class, for example, premium versus business class versus coach class, which could be used for public announcements.

In some embodiments of the present inventive concept, each individual passenger could be beamed audio meant only for that passenger even though the passenger is in a group watching the same video. Thus, each passenger can be targeted individually based on his/her preferred likes and/or customized preferences. Some embodiments of the present inventive concept may be directed at a single passenger or group of passengers to provide noise cancellation or noise reduction of the aircraft or passenger noise within the cabin environment. White noise or comfort noise can also be generated to reduce sporadic noise within the cabin such as a baby crying or a passenger on a cellphone.

It will be understood that directional sound systems in accordance with embodiments discussed herein are configured to be in compliance with Federal Aviation Administration (FAA), Airbus and Boeing environment and electrical certification including flammability and Electromagnetic Interference (EMI).

Figure 10:
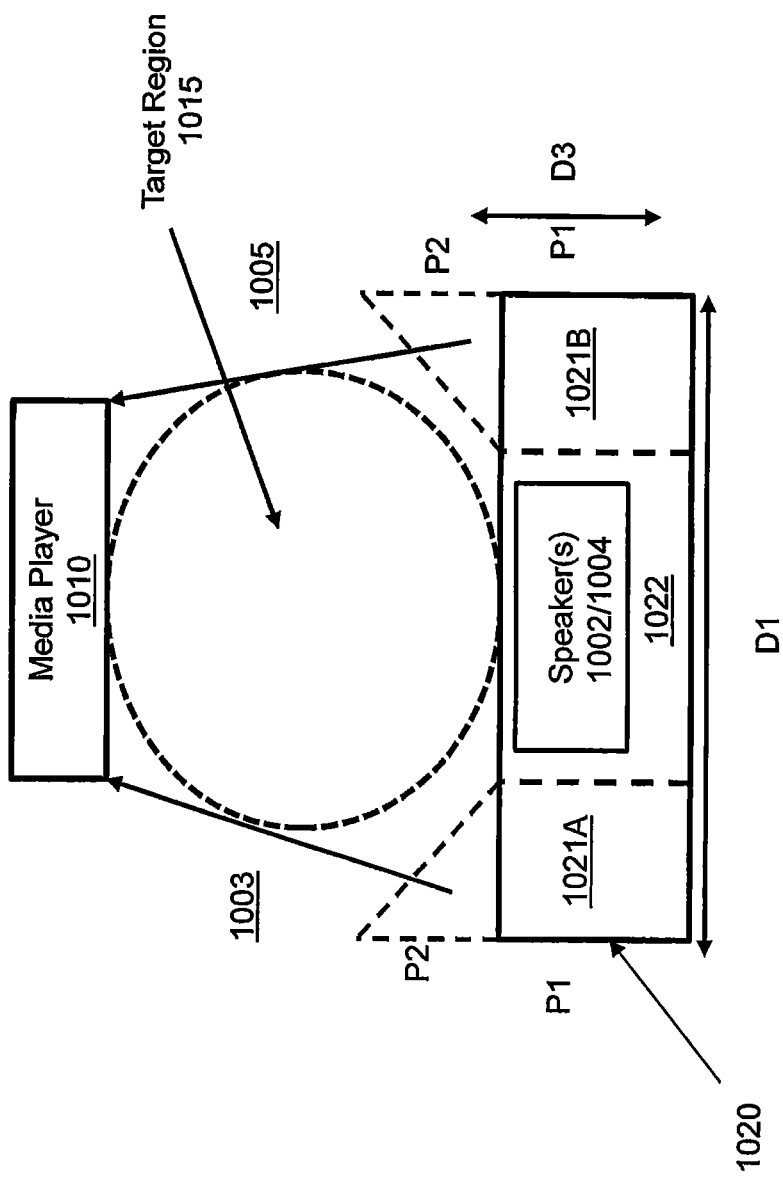
FIG. 10 is a block diagram of a top view of a system including a media player and a headrest in accordance with embodiments of the present inventive concept.

Referring now to FIG. 10, in some embodiments of the present inventive concept the directional sound speakers may be included in the headrest of the passenger's seat. In other words, rather than being embedded in the seat in front of the passenger, the speakers would be including in the headrest of a passenger's actual seat. Placing the speakers therein may allow for adjustment of the headrest to adapt to the height and/or size of the passenger and improve the target region of the directional sound system as will be discussed further below with respect to FIGS. 10 through 15.

Referring first to FIG. 10, a top view of a system including directional sound speakers embedded in the headrest of a passenger seat will be discussed. As illustrated therein, the system, which may be part of an IFE system, includes a media player 1010 and directional sound speakers 1002/1004 embedded in a headrest 1020 of a passenger seat. As illustrated in FIG. 10, the directional sound speakers 1002 and 1004 are embedded in the headrest 1020. The headrest 1020 has three portions, a center portion 1022 and two end portions 1021A/1021B (wings). The two end portions (wings) 1021A and 1021B may be configured to move between a first position P1 and a second position P2 to wrap around the passenger's head. Thus, in embodiments where the speakers are embedded in the wings 1021A/1021B, the speakers are moved closer to the passenger's head/ear. It will be understood that the wings 1021A/1021B may have more than two positions P1 and P2, for example, there may be infinite positions therebetween depending on the size and shape of the passenger's head. As further illustrated in FIG. 10, the headrest may be further configured to move side to side (direction D1), up and down (FIG. 11A—direction D2) and forward and backward (direction D3) to further adjust to the passenger's head as will be discussed further below.

Although the directional sound speakers 1002/1004 are illustrated as being a single unit 1002/1004, it will be understood that embodiments of the present inventive concept are not limited to this configuration. In particular, generally there will be at least two speakers 1002 and 1004 and these speakers may not be positioned directly in the center of the headrest 1020 as shown, but on opposite ends of the headrest 1020 in the wings 1021A and 1021B. Thus, as discussed above, when the wings 1021A and 1021B are adjusted, the speakers 1002 and 1004 may be moved closer to the passenger's ears/head.

Furthermore, as discussed above, the directional sound speakers 1002 and 1004 speakers may be made up of clusters of smaller speakers and/or transducers without departing from the scope of the present inventive concept. Finally, although the media player 1010 and the directional sound speakers 1102/1104 are illustrated as separate components, these components can be combined into one integrated device without departing from the scope of the inventive concept.

The directional sound speakers 1002 and 1004 may be provided by speaker similar to the speakers illustrated in FIGS. 2A through 3B discussed above. However, it will be understood that the size/shape of the speakers may be modified to fit within headrest 1020 and/or wings 1021A/1021B.

The directional sound system is configured to direct sound beams 1003/1005 associated with the media player 1010 to define a target region 1015, such that the sound beam 1003/1005 is only audible within the defined target region 1015. As discussed above, a "sound beam" refers to the output of the directional sound system according to some embodiments of the present inventive concept. Thus, the sound beam 1003/1005 is the product of the sound waves being focused into a beam 1003/1005 directed at the target region. The target region could be, for example, a person or group of persons. In particular embodiments, the target region could be a person in a seat of an aircraft as will be discussed further below. Directional sound systems in accordance with embodiments of the present inventive concept may experience less than about 20 dB of leakage outside the target region 1015 during operation of the media player. In particular, embodiments the target region 1015 experiences no greater than about 5.0 dB of leakage during operation of the media player 1010. Furthermore, directional sound systems in accordance with embodiments discussed herein may be mono, stereo or 5:1 surround sound without departing from the scope of the present inventive concept.

Referring again to FIG. 10, the media player 1010 may be, for example, a smart video display unit (SVDU) of an IFE system. Details of the media player 1010 are discussed above with respect to FIG. 4 and will not be repeated herein in the interest of brevity.

Figure 11A:
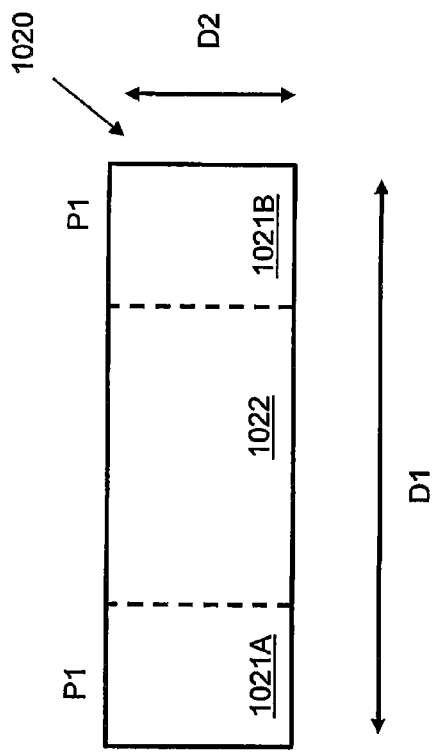
FIGS. 11A and 11B are a front and top view, respectively, of a media headrest in accordance with some embodiments of the present inventive concept.
Figure 11B:
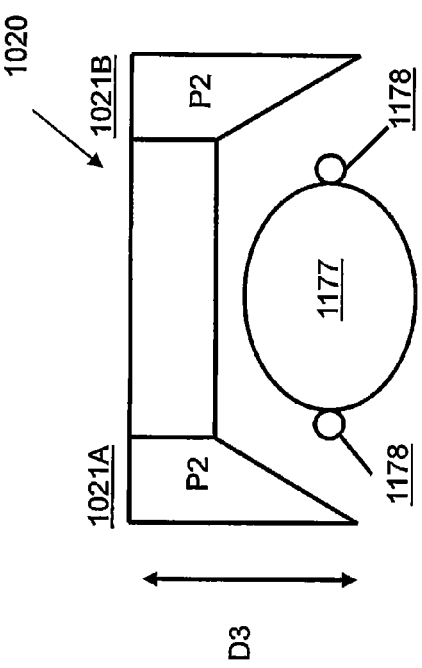

Referring now to FIGS. 11A and 11B, block diagrams of headrests including embedded directional sound speakers according to embodiments of the present inventive concept will be discussed. Referring first to FIG. 11A, a front view of a headrest 1020 having three portions, a center 1022 and two wings 1021A and 1021B will be discussed. As illustrated therein, the wings 1021A and 1021B are in a first position P1 and the headrest 1020 may be configured to move from side to side (D1) and up and down (D2).

Referring now to FIG. 11B, a top view of the headrest 1020 will be discussed. As illustrated therein, the wings 1021A and 1021B are in a folded in second position (P2) which moves them closed to the passenger's head 1177 and ears 1178. Thus, allowing the directional sound speakers 1002/1004 to create a target region 1015 for the passenger. As further illustrated in FIG. 11B, the headrest may also be configured to move forward and backward (D3). Thus, according to embodiments of the present inventive concept a headrest 1020 may be repositioned (side to side, up and down, forward and backward) and wings 1021A and 1021B portions of the headrest 1020 may be moved between positions P1, P2 and there between, to customize the position of the speakers 1002/1004 to the passenger's head 1177 and ears 1178. Each of the movements of the headrest 1020 are independent of the other. Thus, the headrest 1020 may be moved in any of the directions D1, D2 and D3 or any combination thereof without departing from the scope of the present inventive concept.

As will be discussed further herein, the headrest 1020 may be configured to move automatically responsive to eye tracking technologies; responsive to voice commands received by a directional microphone; responsive to voice location via triangulation of the voice by directional microphones thereby locating the head; responsive to manual input by the passenger; responsive to seat sensor location of the head and/or any combination thereof as will be discussed further below with respect to FIGS. 12 through 15.

Figure 12:
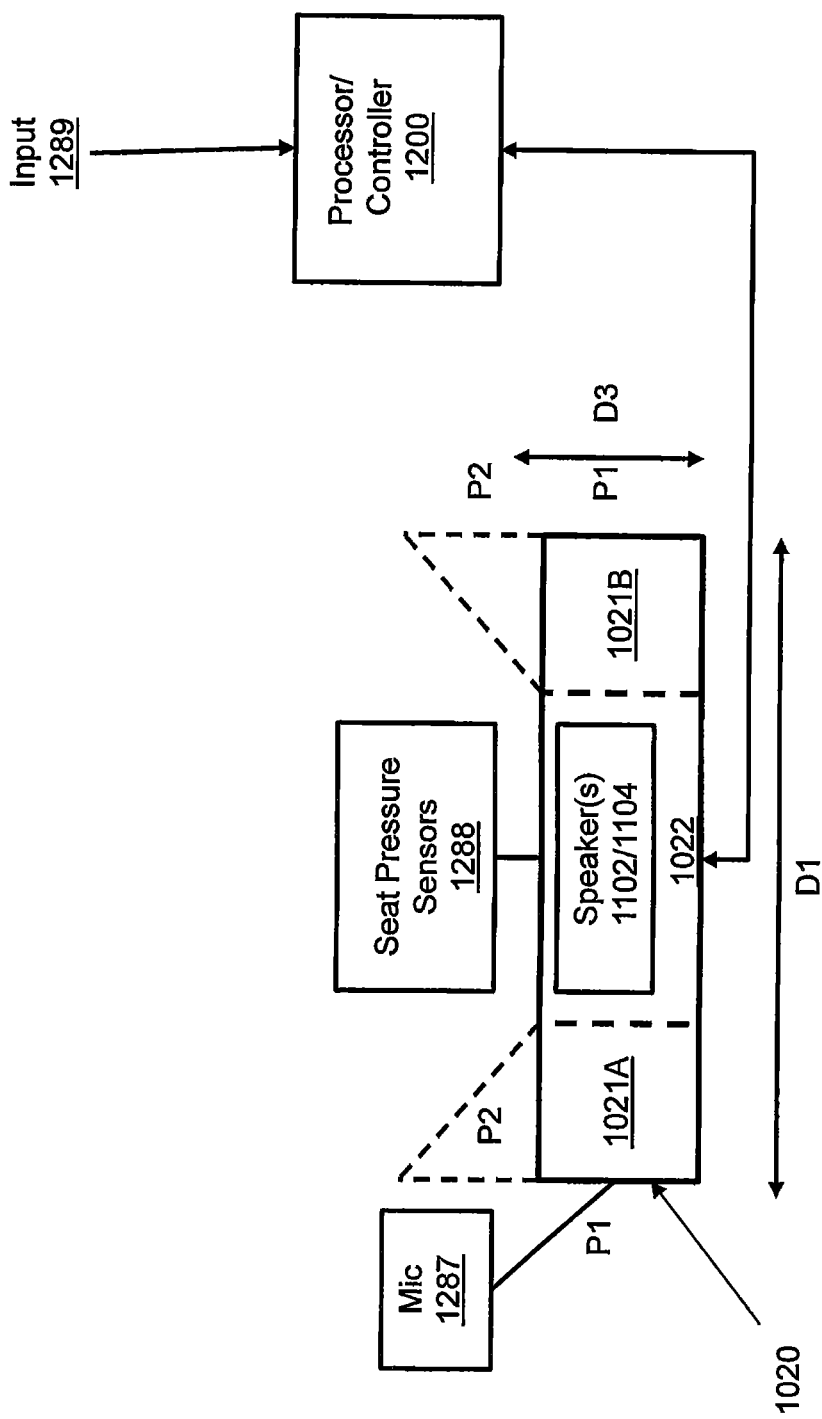
FIG. 12 is a block diagram of a system including a headrest in accordance with some embodiments of the present inventive concept.

Referring now to FIG. 12, a block diagram illustrating external input for manipulating the headrest will be discussed. As will be understood by those having skill in the art, the processor/controller 1200 may be a same processor as illustrated in FIGS. 4 and 5 above and may be configured with respect to embodiments of the present inventive concept discussed with respect to FIGS. 10 through 15. Thus, this processor/controller 1200 may be included in the media player or may be separate therefrom without departing from the scope of the present inventive concept.

As illustrated in FIG. 12, the headrest 1020 may be manipulated responsive to external input 1289. As discussed above, this input 1289 may be a voice of a passenger/user received at a directional microphone 1287. In particular, the directional microphone 1287 could be configured to recognize a voice command stated by a passenger and adjust the headrest 1020 responsive thereto. Voice commands may also be used to control other aspects of the IFE system without departing from the scope of the present inventive concept.

The input 1289 may be a manual input provided by the passenger via, for example, a toggle switch on an arm rest or a digital interface on the media player. The input 1289 may also be through an eye tracking or seat pressure sensor 1288 mechanism that would automatically adjust the headrest 1020 and the wings 1021A and 1021B thereof responsive to the signals received through the eye tracking or seat pressure sensor 1288 mechanism, details of which will be discussed further below. It will also be understood that the headrest 1020 may be adjusted responsive to one or more of these inputs and/or any other input that is capable of communicating with the headrest in accordance with embodiments discussed herein.

Figure 13:
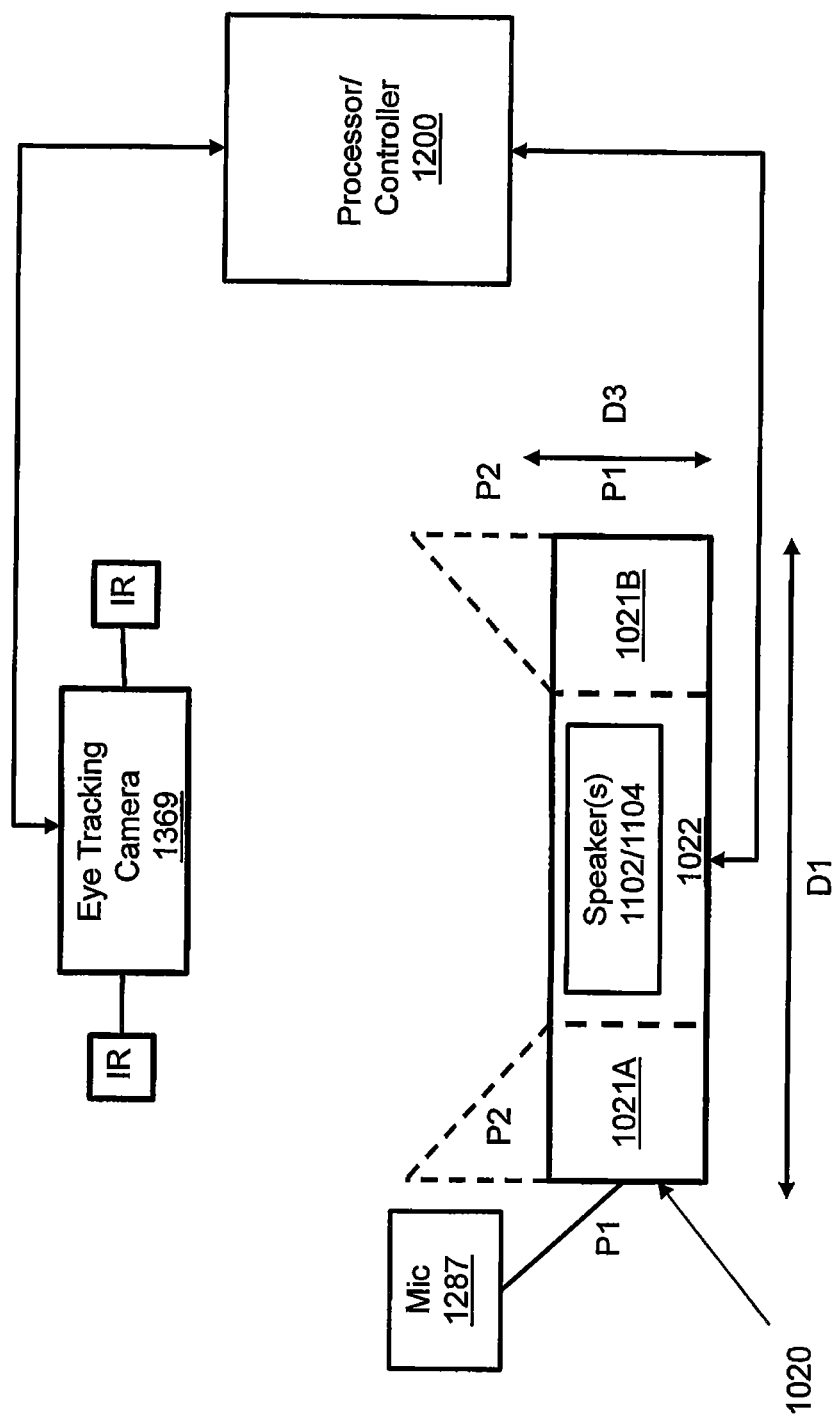
FIG. 13 is a block diagram of a system including a headrest and eye tracking in accordance with some embodiments of the present inventive concept.

Referring now to FIG. 13, a block diagram illustrating an input being relayed by an eye tracking camera will be discussed. As illustrated in FIG. 13, the input to headrest 1020 is provided through the processor/control 1200 from an eye tracking camera and associated infrared sensors (IR). Thus, in some embodiments, when a passenger sits in the seat, the eye tracking camera 1369 and sensors (IR) may be configured to locate eyes of the passenger. This information may be input into the processor/controller 1200 and may be used to determine a location of the passenger's ears. For example, the position of the passenger's ears may be determined via facial recognition. The headrest 1020 may automatically adjust in the various directions D1, D2 and D3 based on the determined position of the passenger's ears to obtain an better position to provide directional sound in accordance with embodiments discussed herein.

It will be understood that once the position of the headrest is automatically adjusted, the passenger may further manually adjust the position of the headrest to optimize the location thereof. Furthermore, is some embodiments, the system may be configured to conduct a sound test, the results of which may be used to further adjust the position of the headrest 1020. For example, an audio test signal may be provided to the passenger and the passenger could either manually adjust the headrest location or it may be automatically adjusted responsive to the test signal.

Figure 14:
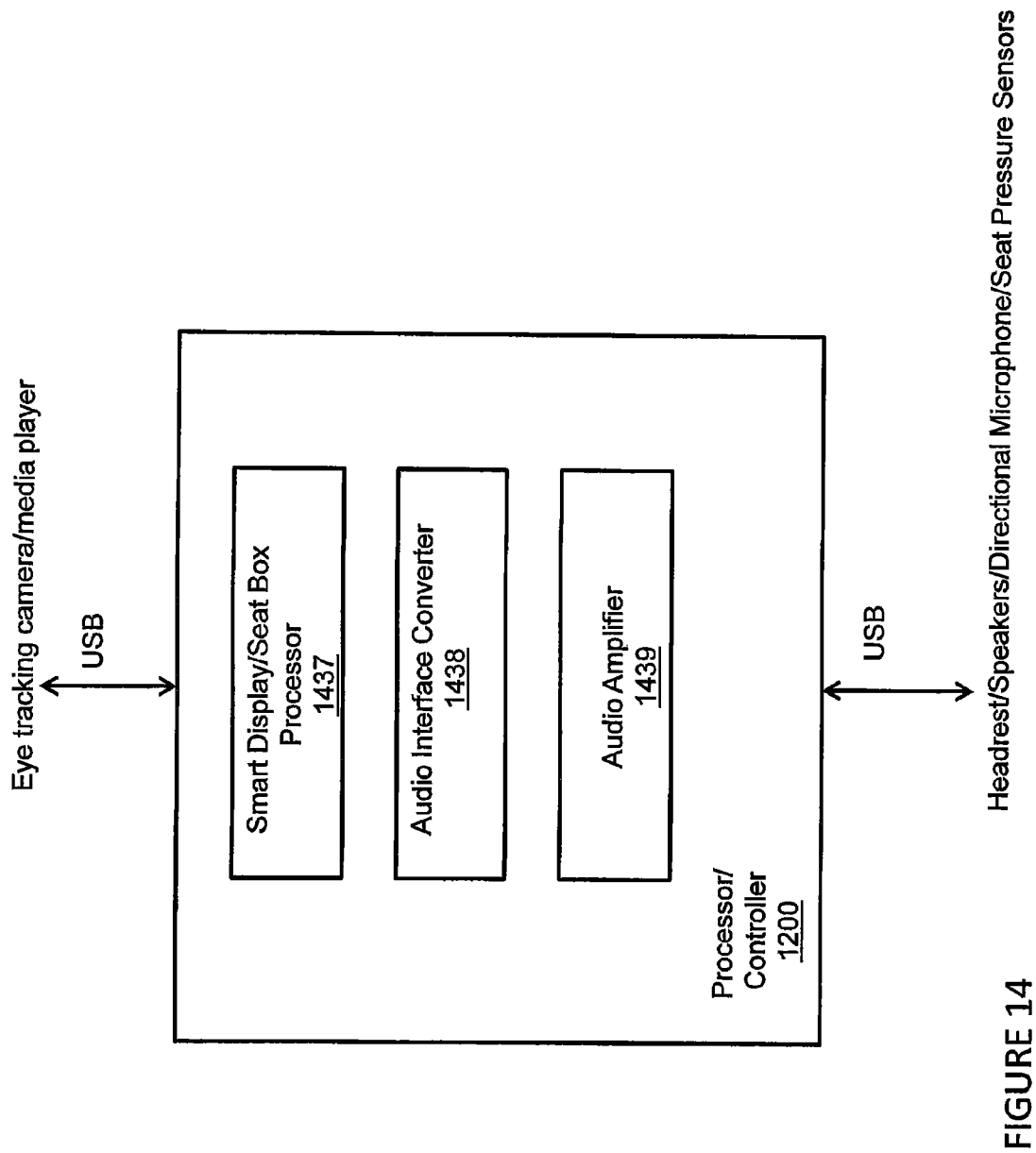
FIG. 14 is a block diagram illustrating a processor in accordance with some embodiments of the present inventive concept.

Referring now to FIG. 14, embodiments of the processor/controller 1200 in accordance with embodiments of the present inventive concept will be discussed. As illustrated therein, the processor/controller 1200 may include a smart display/seat box processor 1437, an audio interface controller 1438 and an audio amplifier 1439. As further illustrated, the processor 1200 communicates with the media player, eye tracking camera, seat pressure sensors, headrest, speakers and directional microphone discussed above.

In particular, the data obtained by the eye tracking camera or seat pressure sensors may be communicated to the processor 1437, which may determine a height of the passenger's ears therefrom and automatically adjust the headrest responsive thereto. As discussed above, manual and audio input may also be received by the processor and used to adjust the headrest.

As further illustrated in FIG. 14, the audio amplifier 1439 in combination with the audio interface convertor 1438 may be configured to receive signals from the directional speakers as well as the directional microphone and this information may be used to further adjust the headrest as well as control various aspect of the IFE system.

Eye tracking in accordance with embodiments of the present inventive concept may be accomplished using any method of eye tracking capable of achieving aspects of the present inventive concept. For example, eye tracking in a vehicle environment is discussed in commonly assigned U.S. application Ser. No. 13/605,176 entitled, Eye Tracking Control of Vehicle Entertainment Systems, the contents of which are hereby incorporated herein by reference as if set forth in its entirety.

Figure 15:
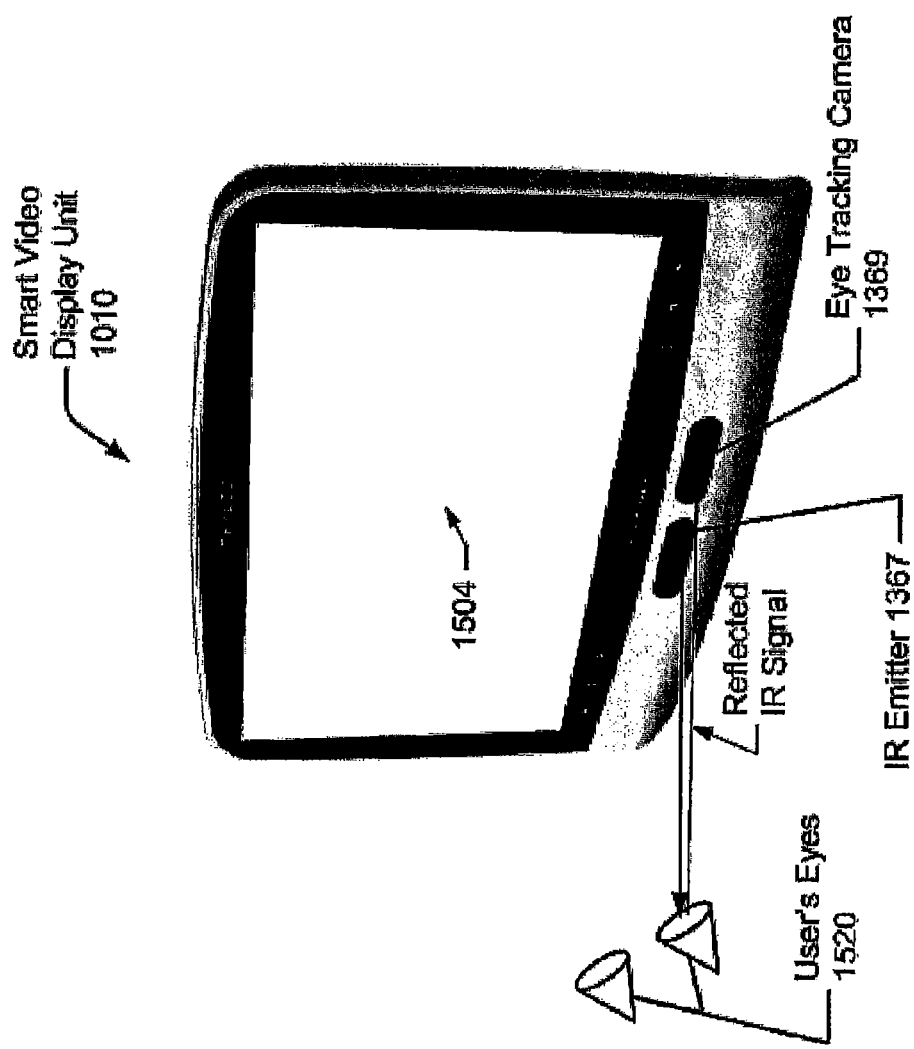
FIG. 15 is block diagram of a media player having an eye tracker in accordance with some embodiments of the present inventive concept.

Referring to FIG. 15, a diagram of an eye tracking system incorporated into a media player in according with some embodiments of the present inventive concept will be discussed. As illustrated in FIG. 15, a smart video display unit 1010 has a display surface 1504 and is configured to display images to a user/passenger. The SVDU 1010 has an eye tracking interface in accordance with embodiments discussed herein that can determine a location of a passenger's eyes on their face, which information can be used in accordance with embodiments discussed herein to located a passenger's ears and adjust the headrest accordingly.

As illustrated, in some embodiments, the eye tracking interface includes at least one eye tracking camera 1369 and at least one light emitter 1367. The light emitter 1367 is configured to illuminate the eyes 1520 of a user/passenger who is seated facing the SVDU 1010.

In some embodiments, the light emitter 1367 can be an infrared (IR) light emitter which can provide advantages over a visible light emitter, including: 1) can be directed toward a person's eyes without annoyance; 2) can be used without disturbing a darkened vehicle environment; 3) provides high reflectively from pupils of eyes; 4) more easily distinguished from other ambient lighting sources in a vehicle environment; and 5) the IR emitter can be increased in intensity to compensate for bright generated light or sunlight within the cabin interior.

The emitted brightness of the light emitter 1367 may be controlled (e.g., by the processor 1200) to increase in response to sensing higher levels of background brightness (e.g., sensed via the video signal from the camera(s) 1369), and to decrease in response to sensing lower levels of background brightness. Thus, for example, while a user's face is brightly lit by sunlight (as sensed via the video signal), the light emitter 1367 can be controlled to output a brighter (higher illumination output) light toward the user's face to compensate for the effects on sunlight (e.g., washed out eye's relative to the face within the video signal) and, thereby, enable accurate tracking of the user's eyes.

The emitted IR light is reflect by the person's eyes (e.g., reflected by the cornea and lens) and returned to the eye tracking camera 1369. The eye tracking camera 1369 and associated circuitry can identify a location of the eyes of the passenger, and can determine a location of the passenger's ears based on this information.

Although embodiments herein are primarily described in the context of an In-Flight Entertainment (IFE) system within an aircraft user cabin, embodiments of the present inventive concept are not limited thereto. Instead, embodiments may be used to provide other types of entertainment systems for trains, automobiles, homes, cruise ships, buses, military transport aircraft, or other environments. Moreover, although some embodiments are described as using a single camera 1369, the invention is not limited thereto and may be used with any number of cameras without departing from the scope of the present inventive concept.

As discussed briefly above, some embodiments of the present inventive concept provide directional sound speakers in a headrest of the passenger seat. The headrest may be adjusted to improve the target region of the directional sound speakers. As discussed above, in some embodiment, the headrest may be automatically adjusted based on input from an eye tracking or seat pressure sensor device. By providing a more efficient target region, passengers may be afforded more privacy while traveling. For example, passengers may be able to communicate seat to seat via Video/Audio chat without disturbing other passengers or exposing their personal conversation to strangers.

In the above-description of various embodiments of the present inventive concept, it is to be understood that the terminology used herein is for the purpose of describing particular embodiments only and is not intended to be limiting of the inventive concept. Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another node, it can be directly connected, coupled, or responsive to the other element or intervening element may be present. In contrast, when an element is referred to as being "directly connected", "directly coupled", "directly responsive", or variants thereof to another element, there are no intervening element present. Like numbers refer to like element throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present inventive concept may be embodied in hardware and/or in software (including firmware, resident software, micro-code, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present inventive concept. All such variations and modifications are intended to be included herein within the scope of the present inventive concept.

That which is claimed is:

1. An entertainment system comprising:
   directional sound speakers embedded in a headrest of a passenger seat; and
   a directional sound controller connected to receive signals from a media player of the entertainment center and to provide signals to the directional sound speakers that direct sound beams to a defined target region such that the sound beams are only audible within the defined target region experiencing less than about 20 dB of leakage outside the target region while the sound beams are being provided b the directional sound speakers; and
   wherein the directional sound controller is configured to adjust a location of the target region responsive to eye tracking input from an eye tracking system that tracks location of the passenger's eyes.

2. The entertainment system of claim 1:
   wherein the headrest including the directional sound speakers comprises three portions, a center portion and two wing portions, wherein the directional sound speakers are located in the two wing portions; and
   wherein the system is configured to adjust the location of the target region by moving the two wing portions relative to the center portion of the headrest responsive to the eye tracking input.

3. The entertainment system of claim 2, wherein the headrest is configured to move at least one of up and down; side to side; and forward and backward to adjust the location of the target region relative to the position of the passenger seated in the passenger seat.

4. The entertainment system of claim 2, wherein the two wing portions are configured to move between a first position, more remote from ears of the passenger, to a second position, closer to ears of the passenger responsive to control of the directional sound controller.

5. The entertainment system of claim 1, wherein the system is configured to adjust the headrest including the directional sound speakers responsive to voice input of the passenger.

6. The entertainment system of claim 1, wherein the eye tracking system comprises at least one eye tracking camera and associated sensors,
   wherein the eye tracking system is configured to obtain a location of a passenger's eyes such that a position of the passenger's ear are determined; and
   wherein the location of the target region is adjusted by the directional sound controller responsive to the determination of the position of the passenger's eyes so the ears are located within the target region.

7. The entertainment system of claim 1:
   wherein the system further comprises a directional microphone;
   wherein the system is further configured to obtain a location of a passenger's ears by locating a direction of a voice via the directional microphone;
   wherein the system is further configured to calculate the location of the passenger's ears based on location of a mouth via voice source location.

8. The entertainment system of claim 1:
   wherein the system further comprises pressure sensors associated with the passenger seat; and
   wherein the system is further configured to adjust the location of the target region based on information obtained from the pressure sensors.

9. The entertainment system of claim 1, wherein the entertainment system comprises an in-flight entertainment (IFE) system on an aircraft.

10. The entertainment system of claim 1, wherein the entertainment system is integrated with a vehicle.

11. The entertainment system of claim 1, wherein the eye tracking system is configured to adjust the height of the headrest including the directional sound speakers responsive to the location of the passenger's eyes.

12. The entertainment system of claim 1, wherein the eye tracking system is configured to adjust the angle of the directional sound speakers in the headrest responsive to the location of the passenger's eyes.

13. The entertainment system of claim 1, wherein controlling a plurality of audio transducers in each of the directional sound speakers to direct emitted sound toward the passenger responsive to the location of the passenger's eyes.

14. A method of providing an entertainment system comprising:
   providing a passenger seat having at least two directional sound speakers in a headrest; and
   adjusting the headrest including the at least two directional sound speakers to accommodate a passenger seated in the passenger seat such that a defined target region in which an audible sound beam is customized for the passenger seated in the passenger seat;
   operating a directional sound controller connected to receive signals from a media player of the entertainment center and to provide signals to the directional sound speakers that direct sound beams to a defined target region such that the sound beams are only audible within the defined target region experiencing less than about 20 dB of leakage outside the target region while the sound beams are being provided by the directional sound speakers; and adjusting a location of the target region responsive to eye tracking input from an eye tracking system that tracks location of the passenger's eyes.

15. The method of claim 14:

wherein the headrest including the directional sound speakers comprises three portions, a center portion and two wing portions, wherein the directional sound speakers are located in the two wind portions; and wherein the adjusting comprises adjusting the location of the target region by moving the two wing portions relative to the center portion of the headrest.

16. The method of claim 15, wherein the adjusting comprises at least one of moving the headrest up and down; side to side; and forward and backward, responsive to input received from the eye tracking system to place the headrest into the target region.

17. The method of claim 15, wherein the adjusting comprises moving the two wing portions between a first position, remote from ears of the passenger, to a second position, closer to ears of the passenger, responsive to eye tracking input received from the eye tracking system to adjust location of the defined target region.

18. The method of claim 17, further comprising adjusting the two wings to one of a plurality of positions between the first position and the second position, responsive to the eye tracking input from the eye tracking system.

19. The method of claim 15, wherein adjusting further comprises adjusting the position of the headrest and target region responsive to at least one of voice inputs of the passenger; manual input of the passenger; seat pressure sensors of the passenger; and eye tracking input from the passenger's eyes.

20. The method of claim 19, further comprising:

obtaining a location of a passenger's eyes such that a position of the passenger's ear are determined; and adjusting the headrest responsive to the determination of the position of the passenger's ears.

21. The method of claim 20, further comprising fine tuning the position of the headrest using one of audio input, manual input or a combination thereof.

22. The method of claim 14, further comprising:

obtaining a location of a passenger's ears by locating a direction of a voice via a directional microphone; and calculating the location of the passenger's ears based on location of a mouth via voice source location.

23. The method of claim 14, further comprising locating head and ears of a passenger based on information obtained from pressure sensors in the passenger seat.

24. An entertainment system comprising:

directional sound speakers associated with a media player of the entertainment system;

a hood that is connected to a seat and configured to be positioned over a target region; and a directional sound controller associated with the directional sound speakers, the directional sound controller being configured to respond to signals from the media player by providing signals to the directional sound speakers that direct sound beams to the target region such that the sound beams are only audible within the defined target region experiencing less than about 20 dB of leakage outside the target region while the sound beams are being provided by the directional sound speakers, wherein the hood constrains sound from the sound beams to with the target region.

25. The entertainment system of claim 24, wherein the directional sound controller and hood are configured so the target region experiences no greater than about 5.0 dB of leakage while the sound beams are being provided by the directional sound speakers.

26. The entertainment system of claim 24, wherein the directional sound controller comprises a beam forming and audio wave shaping module configured to direct the sound beams to converge at a preset distance from the directional sound speakers.

27. The entertainment system of claim 26, wherein the preset distance is from about 2.5 to about 10 feet from the directional sound speakers.

28. The entertainment system of claim 26, wherein the sound beams extend no greater than about 2.5 feet from the directional sound speakers.

29. The entertainment system of claim 24, wherein each of the directional sound speakers comprises a cluster of smaller speakers and/or transducers that are separately fed signals by the directional sound controller.

30. The entertainment system of claim 29, wherein each of the directional sound speakers comprises a cluster of about 50 to about 200 audio transducers that are separately fed signals by the directional sound controller.

31. The entertainment system of claim 24, wherein the directional sound controller further comprises a noise cancelling/reduction module that is configured to reduce and/or neutralize sound leakage outside the target region.

32. The entertainment system of claim 24, wherein the entertainment system comprises an in-flight entertainment (IFE) system on an aircraft.

33. The entertainment system of claim 32, wherein the media player comprises a smart video display unit associated with the IFE system, the smart video display unit being integrated into a seatback of another seat located forward to the seat.

34. A method of directing sound of a media player on an aircraft, the method comprising:

providing a hood that is connected to a seat and configured to be positioned over a target region; and operating a directional sound controller to respond to signals from the media player by providing signals from the media player to directional sound speakers that direct sound beams to a defined target region such that the sound beams are only audible within the defined target region experiencing less than about 20 dB of leakage outside the target region while the sound beams are being provided by the directional sound speakers, wherein the hood constrains sound from the sound beams to with the target region.

35. The method of claim 34, wherein the directional sound controller and hood are configured so the target region experiences no greater than about 5.0 dB of leakage while the sound beams are being provided by the directional sound speakers.

36. The entertainment system of claim 34, wherein the directional sound controller comprises a beam forming and audio wave shaping module configured to direct the sound beams to converge at a preset distance from the directional sound speakers.

37. The entertainment system of claim 34, wherein each of the directional sound speakers comprises a cluster of smaller speakers and/or transducers that are separately fed signals by operation of the directional sound controller.

* * * * *